(12) United States Patent
Donelle

(10) Patent No.: US 11,057,733 B2
(45) Date of Patent: Jul. 6, 2021

(54) METHODS OF DETERMINING THE LOCATION OF A USER IN AN AREA, AND USER LOCATION SYSTEMS

(71) Applicant: AKSOR, Saint-Thibault des Vignes (FR)

(72) Inventor: Thibaud Donelle, Saint-Thibault des Vignes (FR)

(73) Assignee: AKSOR, Saint-Thibault (FR)

( * ) Notice: Subject to any disclaimer, the term of this patent is extended or adjusted under 35 U.S.C. 154(b) by 0 days.

(21) Appl. No.: 16/498,343

(22) PCT Filed: Mar. 27, 2018

(86) PCT No.: PCT/EP2018/057752
§ 371 (c)(1),
(2) Date: Sep. 26, 2019

(87) PCT Pub. No.: WO2018/178066
PCT Pub. Date: Oct. 4, 2018

(65) Prior Publication Data
US 2020/0077226 A1    Mar. 5, 2020

(30) Foreign Application Priority Data
Mar. 27, 2017   (GB) .................................... 1704800

(51) Int. Cl.
*H04W 4/021*   (2018.01)
*G06Q 20/18*   (2012.01)
(Continued)

(52) U.S. Cl.
CPC ............ *H04W 4/021* (2013.01); *G06Q 20/18* (2013.01); *G06Q 50/12* (2013.01); *H04W 4/023* (2013.01)

(58) Field of Classification Search
CPC ..... H04W 4/021; H04W 4/023; H04W 4/029; H04W 4/33; H04W 4/35; H04W 4/80; G06Q 20/18; G06Q 50/12
See application file for complete search history.

(56) References Cited

U.S. PATENT DOCUMENTS

| 4,275,385 A | 6/1981 | White |
| 6,424,264 B1 | 7/2002 | Giraldin et al. |

(Continued)

FOREIGN PATENT DOCUMENTS

| EP | 2955898 A1 | 12/2015 |
| KR | 20080038478 A | 5/2008 |
| WO | WO 2000038460 A1 | 6/2000 |

OTHER PUBLICATIONS

International Search Report and Written Opinion of PCT/EP2018/057752 dated May 14, 2018, 9 pp.

(Continued)

*Primary Examiner* — Jean A Gelin
(74) *Attorney, Agent, or Firm* — Lathrop GPM, LLP

(57) ABSTRACT

A method of determining the location of a user in an area. A user requests a transmitting device from a transmitter providing device. The transmitter providing device associates an identification code with the user, and the transmitting device transmits that identification code. One or more of receiving devices receive the identification code transmitted by the transmitting device, and send details of the received identification code to the user location determining device. The user location determining device then determines the location of the user, using the received details from the one or more receiving devices.

2 Claims, 8 Drawing Sheets

(51) Int. Cl.
*G06Q 50/12* (2012.01)
*H04W 4/02* (2018.01)

(56) References Cited

U.S. PATENT DOCUMENTS

| | | | |
|---|---|---|---|
| 8,260,323 B1 | 9/2012 | Bronner et al. | |
| 2004/0169589 A1 | 9/2004 | Lea et al. | |
| 2004/0174264 A1* | 9/2004 | Reisman | G08B 21/0202 340/573.4 |
| 2006/0132300 A1 | 6/2006 | Howe et al. | |
| 2007/0214040 A1* | 9/2007 | Patel | G06Q 30/0259 705/14.17 |
| 2008/0288357 A1* | 11/2008 | Stambaugh | G06Q 10/06 705/15 |
| 2009/0138353 A1* | 5/2009 | Mendelson | G01S 5/02 705/14.39 |
| 2012/0206237 A1 | 8/2012 | Lovegreen | |
| 2015/0017967 A1* | 1/2015 | Cao | H04W 8/22 455/418 |
| 2015/0065078 A1* | 3/2015 | Mejia | H04M 11/04 455/404.1 |
| 2015/0219757 A1* | 8/2015 | Boelter | G01S 13/0209 701/519 |
| 2018/0253947 A1* | 9/2018 | Muhsin | G06F 3/167 |
| 2018/0314801 A1* | 11/2018 | Janssen | G16H 40/20 |
| 2018/0369039 A1* | 12/2018 | Bhimavarapu | A61G 7/10 |
| 2019/0088100 A1* | 3/2019 | Shapiro | G08B 21/0266 |
| 2020/0029295 A1* | 1/2020 | Srinivasan | H04W 4/027 |

OTHER PUBLICATIONS

GB Patent Application No. 1704800.0, Search Report dated Aug. 17, 2017, 4 pp.
Chu et al. (2011), "High-Accuracy Indoor Personnel Tracking System with a ZigBee Wireless Sensor Network," Seventh International Conference on Mobile Adhoc and Sensor Networks (MSB), 5 pp. [available from http://ieeexplore.ieee.org/document/6117453].

\* cited by examiner

METHODS OF DETERMINING THE LOCATION OF A USER IN AN AREA, AND USER LOCATION SYSTEMS

FIELD OF THE INVENTION

The present invention concerns methods of determining the location of a user in an area, and user location systems. More particularly, but not exclusively, the invention concerns determining the location of a user in an area where the user has been provided with a transmitting device, using a plurality of receiving devices distributed in different locations within the area.

BACKGROUND OF THE INVENTION

It can be desirable to determine the location of a user in an area, for example where the area is a quick service restaurant and the user is a dining customer. In this case, the user may order their food from a kiosk or other food-ordering location. When the user's food order is ready, they may have to collect their order from an order-collection location. However, this can be disadvantageous for a number of reasons. First, if users congregate near the order-collection location this can cause congestion, particularly if the order-collection location is also the food-ordering location. Second, users may prefer to move to a seating area while waiting for their order to be prepared. This means that a system is required to notify them when their order is ready, and there is a risk that they will not become aware of such a notification.

An alternative solution that allows users to move to a seating area while waiting for their order is for each order made by a user to be assigned an order number. The user is then provided with a sign showing the order number when they make their order, which they take with them to the seating area. When their order has been prepared, rather than the user collecting the order from the order-collection location, it is taken to them at the seating area by a member of staff, with the member of staff using the sign to identify the location of the user using the order number. However, it can be time consuming and inefficient for the staff member to find the user, particularly in a large seating area.

Similar disadvantages can arise where the area is a retail store and the user is the customer, for example. In this case, the user may have ordered items and be visiting the store to collect them. When the user's order is ready, the user may have to collect their order from an order-collection location. Similarly to the example above, users may congregate near the order-collection location while waiting for their orders to be ready, which can cause congestion. Additionally, users may wish to buy additional items and/or visit an area such as a coffee area while their order is being prepared.

The present invention seeks to solve and/or mitigate the above-mentioned problems. Alternatively or additionally, the present invention seeks to provide improved methods of determining the location of a user in an area and user location systems.

SUMMARY OF THE INVENTION

In accordance with a first aspect of the invention there is provided a method of determining the location of a user in an area, using:
a transmitter providing device located at a first location;
a plurality of receiving devices distributed in different locations within the area; and
a user location determining device in communication with the plurality of receiving devices;
wherein the method comprises the steps of:
a user at the first location requesting a transmitting device from the transmitter providing device;
the transmitter providing device associating an identification code with the user;
the transmitter providing device providing the user with a transmitting device, wherein the transmitting device transmits the identification code associated with the user;
the user moving to a second location with the transmitting device, the second location being within the area;
one of more of the receiving devices receiving the identification code transmitted by the transmitting device;
the one or more receiving devices sending details of the received identification code to the user location determining device; and
the user location determining device determining the location of the user, using the received details from the one or more receiving devices.

In this way, a transmitting device can be provided to the user, which the user can then take to the second location. The user's location at the second location can then be determined by the user location determining device, using the identification code associated with the user and transmitted by the transmitting device, which will be received by the one or more of the receiving devices that are distributed in different locations within the area.

The area may be a restaurant or part thereof, such as a quick service restaurant. The transmitter providing device may comprise a food ordering device that allows the user to make a food order. Alternatively, the food ordering device may be located in the first location with, and in communication with, the transmitter providing device. In either case, the user can thus be providing with the transmitting device when they make their food order. The first location may, but need not, be within the area. The transmitting device may be arranged to notify the user when their order is ready. For example, the user location determining device may be notified that the user's order is ready, and then communicate this to the transmitting device using the one or more receiving devices.

Alternatively, the area may be a retail store providing a "click-and-collect service", i.e. a service using which a user can remotely order items, for example from their home via a website, and then later collect their order from the retail store. In this case, the transmitter providing device may comprise a check-in device that allows the user to notify the system that they are at the retail store to collect their order.

The transmitter providing device may comprise a store of a plurality of transmitting devices, and provides the user with a transmitting device from the store of transmitters. In this case, advantageously the transmitting devices of the store of transmitting devices are arranged to not transmit an identification code when stored in the store of transmitting devices. This allows the transmitting devices to conserve battery power when not in use, i.e. when their location does not need to be determined. It also allows the transmitter providing device to obtain the identification code by simply receiving the identification code transmitted by a transmitting device when it leaves the store, as none of the transmitting devices in the store will be transmitting an identification code. The transmitter providing device may generate a magnetic field that is above a predetermined threshold at locations within the store of transmitting devices, and the transmitting devices may be arranged to transmit an identification code only when not within a magnetic field that is above the predetermined threshold. Advantageously, the transmitter providing device is arrange to recharge the transmitting devices while in the store of transmitting devices. In this case, the transmitting devices are advantageously arranged to not transmit an identification code while being recharged.

Preferably, the transmitter providing device dispenses the transmitting device from the store of transmitting devices to the user via a dispensing slot. In this case, advantageously the method further comprises the steps of: one or more transmitting devices being inserted into the dispensing slot of the transmitter providing device; and the transmitter providing device storing the one or more transmitting devices in the store of transmitting devices.

In an advantageous alternative, the transmitter providing device provides an identification code to a mobile device presented to the transmitter providing device, and wherein the mobile device with received identification code is the transmitting device provided to the user. This means that no transmitting devices need to be specially provided, as users can use their own mobile devices as the transmitting device. Preferably, the mobile device is a mobile telephone. Preferably, the mobile device communicates with the transmitter providing device using Bluetooth. However, any other suitable method of communication may be used.

Preferably, the transmitting device transmits the identification code to the one of more of the receiving devices using Bluetooth. However, any other suitable method of communication may be used.

Preferably, the user location determining device determines the location of the user using the strength of the signal received from the transmitting device by the one or more receiving devices.

Advantageously, the area comprises a plurality of potential user locations, and the determined location of the user is one of the plurality of potential user locations. This allows the location of the user to be determined more efficiently and accurately.

In accordance with a second aspect of the invention there is provided a user location system for determining the location of a user in an area, comprising:

a transmitter providing device located at a first location;

a plurality of receiving devices distributed in different locations within the area; and a user location determining device in communication with the plurality of receiving devices;

wherein the transmitter providing device is arranged, in response to a request from a user for a transmitting device, to associate an identification code with the user, and to provide the user with a transmitting device, wherein the transmitting device is arranged to transmit the identification code associated with the user;

wherein the plurality of receiving devices are arranged to receive an identification code transmitted by a transmitting device, and to send details of a received identification code to the user location determining device;

and wherein the user location determining device is arranged to determine the location of a user using received details from the one or more receiving devices.

The transmitter providing device may comprise a store of a plurality of transmitting devices, and be arranged to provide the user with a transmitting device from the store of transmitting devices. In this case, advantageously the transmitting devices of the store of transmitting devices are arranged to not transmit an identification code when stored in the store of transmitting devices. The transmitter providing device may generate a magnetic field that is above a predetermined threshold at locations within the store of transmitting devices, and the transmitting devices may be arranged to transmit an identification code only when not within a magnetic field that is above the predetermined threshold. Advantageously, the transmitter providing device is arrange to recharge the transmitting devices while in the store of transmitting devices.

Preferably, the transmitter providing device is arranged to dispense the transmitting device from the store of transmitting devices to the user via a dispensing slot. In this case, advantageously the transmitter providing device is further arranged to receive one or more transmitting devices inserted into the dispensing slot and to store the one or more transmitting devices in the store of transmitting devices.

In an advantageous alternative, the transmitter providing device is arranged to provide an identification code to a mobile device presented to the transmitter providing device, and the mobile device with received identification code is the transmitting device provided to the user. Preferably, the mobile device is a mobile telephone. Preferably, the mobile device is arranged to communicate with the transmitter providing device using Bluetooth.

Preferably, the transmitting device is arranged to transmit the identification code to the one of more of the receiving devices using Bluetooth.

Preferably, the user location determining device is arranged to determine the location of the user using the strength of the signal received from the transmitting device by the one or more receiving devices.

Advantageously, the area comprises a plurality of potential user locations, and wherein the user location determining device is arranged to determine the location of the user as one of the plurality of potential user locations.

In accordance with a third aspect of the invention there is provided a method of determining the location of a user in an area substantially as herein described with reference to any of FIGS. 1 to 8 of the accompanying drawings.

In accordance with a fourth aspect of the invention there is provided a user location system substantially as herein described with reference to any of FIGS. 1 to 8 of the accompanying drawings.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
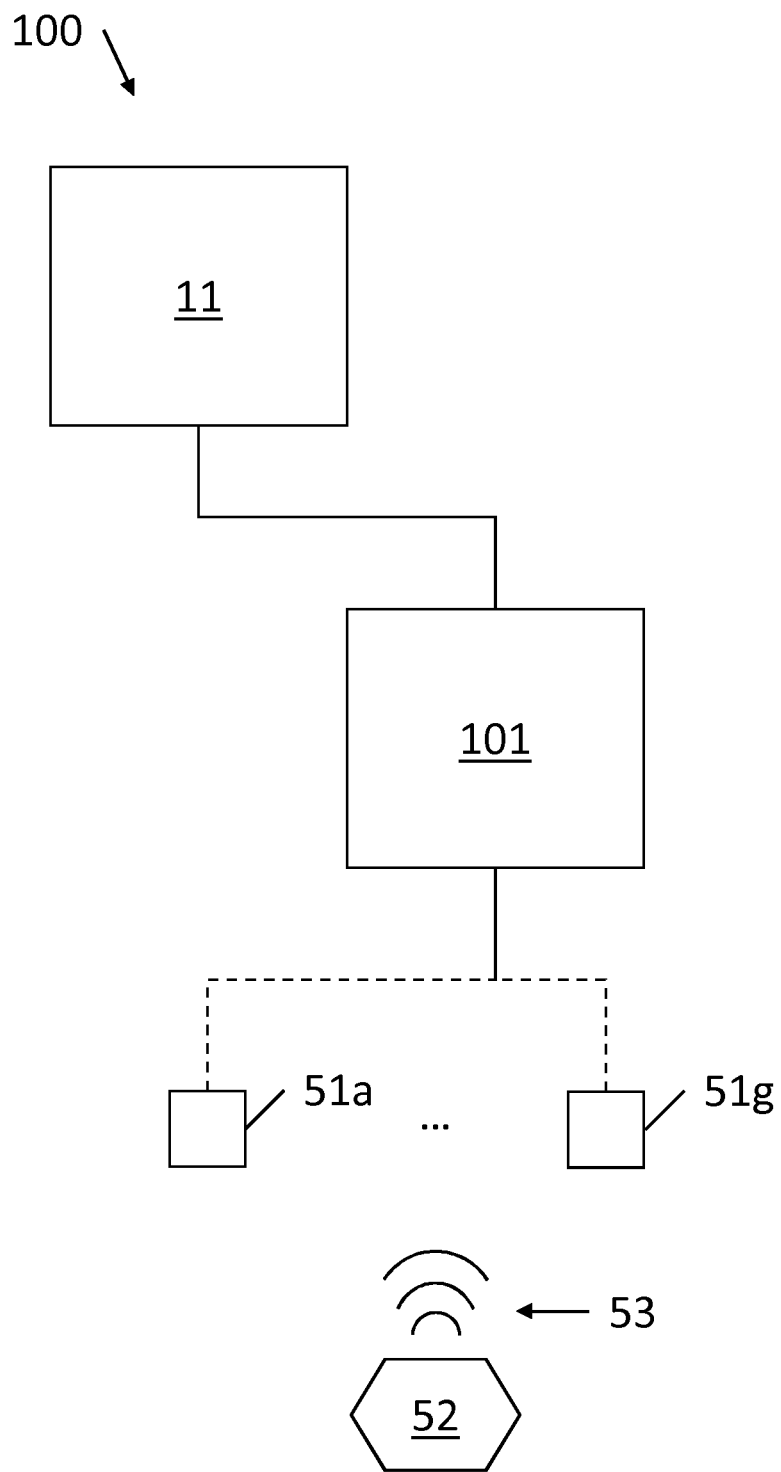
FIG. 1 shows a user location system in accordance with an embodiment of the invention.

A user location system in accordance with an embodiment of the invention is shown in FIG. 1. In the present example the user location system 100 is used to locate a user in a quick service restaurant, and the user is a customer making a food order in the quick service restaurant. However, it will be appreciated that the invention is applicable to other situations, including but not limited to other types of restaurant.

The user location system 100 comprises a transmitter providing device 11, as described in more detail below. The transmitter providing device 11 is in communication with a user location determining device 101, again as described in more detail below. The transmitter providing device 11 and user location determining device 101 may be in communication via a local area network (LAN), for example. The LAN connection may be wired or wireless, for example via Wi-Fi.

The user location system 100 also comprises a plurality of receiving devices 51a to 51g, which are able to receive radio signals. The receiving devices 51a to 51g are in communication with the user location determining device 101. The user location system 100 and receiving devices 51a to 51g may be in communication via a LAN, which may be wired or wireless, or may be in communication via Bluetooth, for example.

Finally, the user location system 100 comprises a transmitting device 52, which transmits a radio signal 53 which is received by one or more of the receiving devices 51a to 51g.

Figure 2:
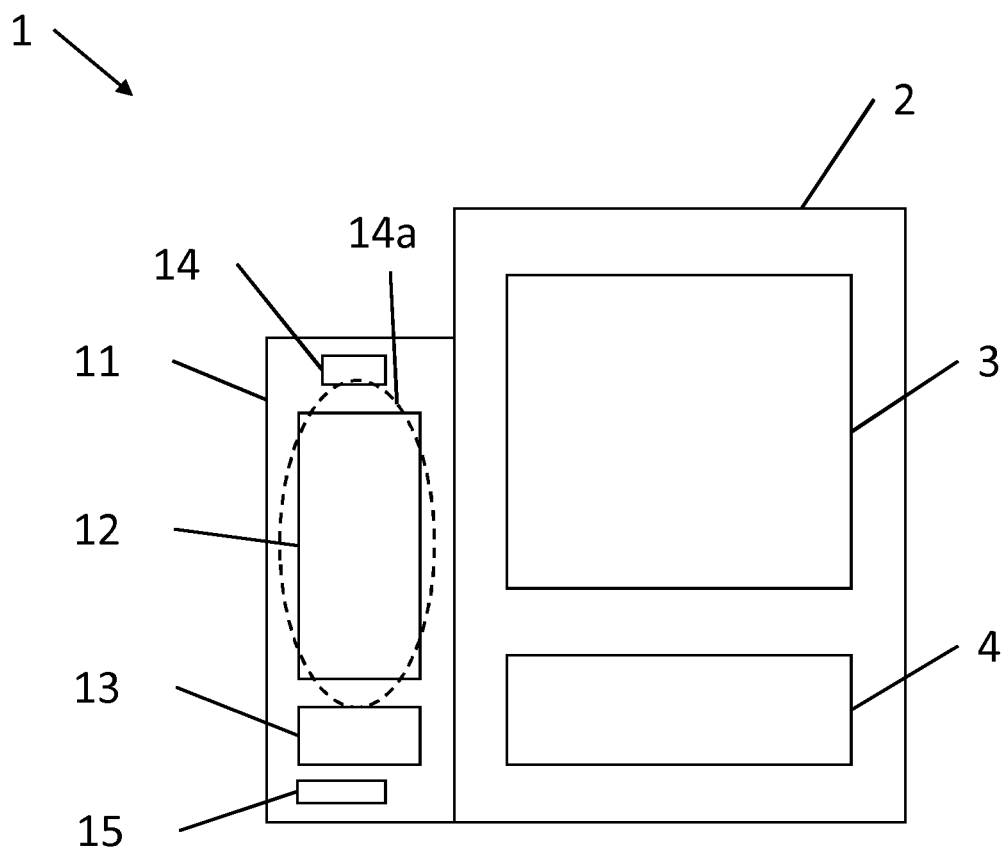
FIG. 2 shows the transmitter providing device of the user location system of FIG. 1.

The transmitter providing device 11 of FIG. 1 is shown in more detail in FIG. 2. The transmitter providing device 11 comprises a store 12 of transmitting devices of the type of the transmitting device 52, and providing means (not shown) to provide transmitting devices from the store 12 to a user via a dispensing slot 13. The transmitter providing device 11 also comprises a magnetic field producing device 14, such as an electromagnet, which generates a magnetic field 14a which encompasses the store 12. In other embodiments other means of generating a magnetic field encompassing the store 12 can be used, for example a plurality of permanent magnets arranged around the store 12. The transmitter providing device 11 also comprises a radio receiver 15.

The transmitter providing device 11 is provided next to, and is in communication with, a food ordering device 2. The food ordering device comprises a touch screen 3, using which a user can select various food items that they wish to order, and payment means 4, which can accept cash and/or credit card payments or the like.

Figure 3:
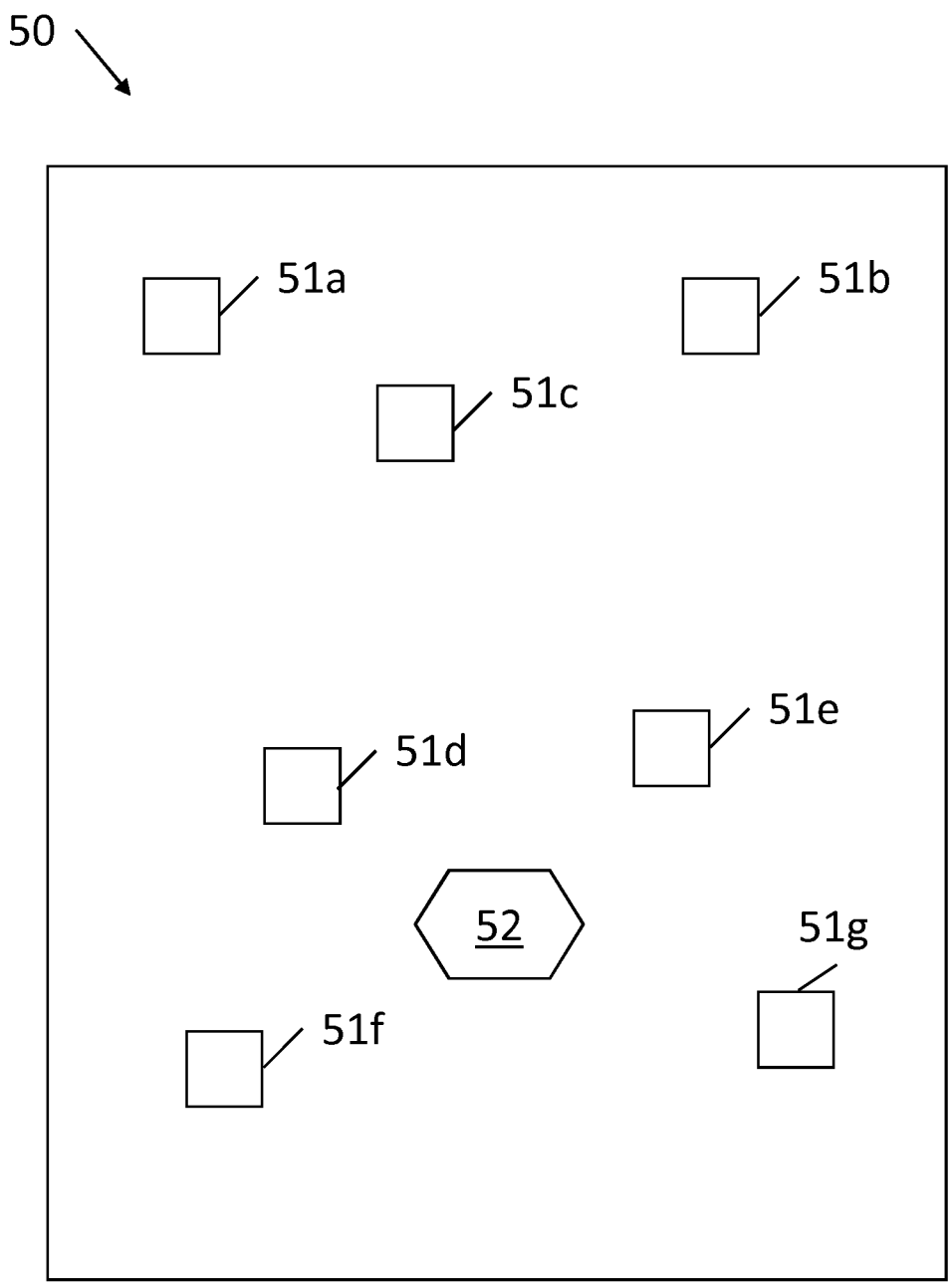
FIG. 3 shows a transmitting device and a plurality of receiving devices distributed in an area of the user location system of FIG. 1.

The area in which users can be located by the user location system 100 is shown in FIG. 3. In the present example, the area 50 is the interior of the quick service restaurant. As can be seen, the receiving devices 51a to 51g are distributed in different locations around the area 50. In practice, they may be located on or within the ceiling of the quick service restaurant, for example, or within walls or furniture, or in other locations in which they are able to receive radio signals. In addition, the transmitting device 52 is within the area 50, in a location between the receiving devices 51d, 51e, 51f and 51g.

Figure 4:
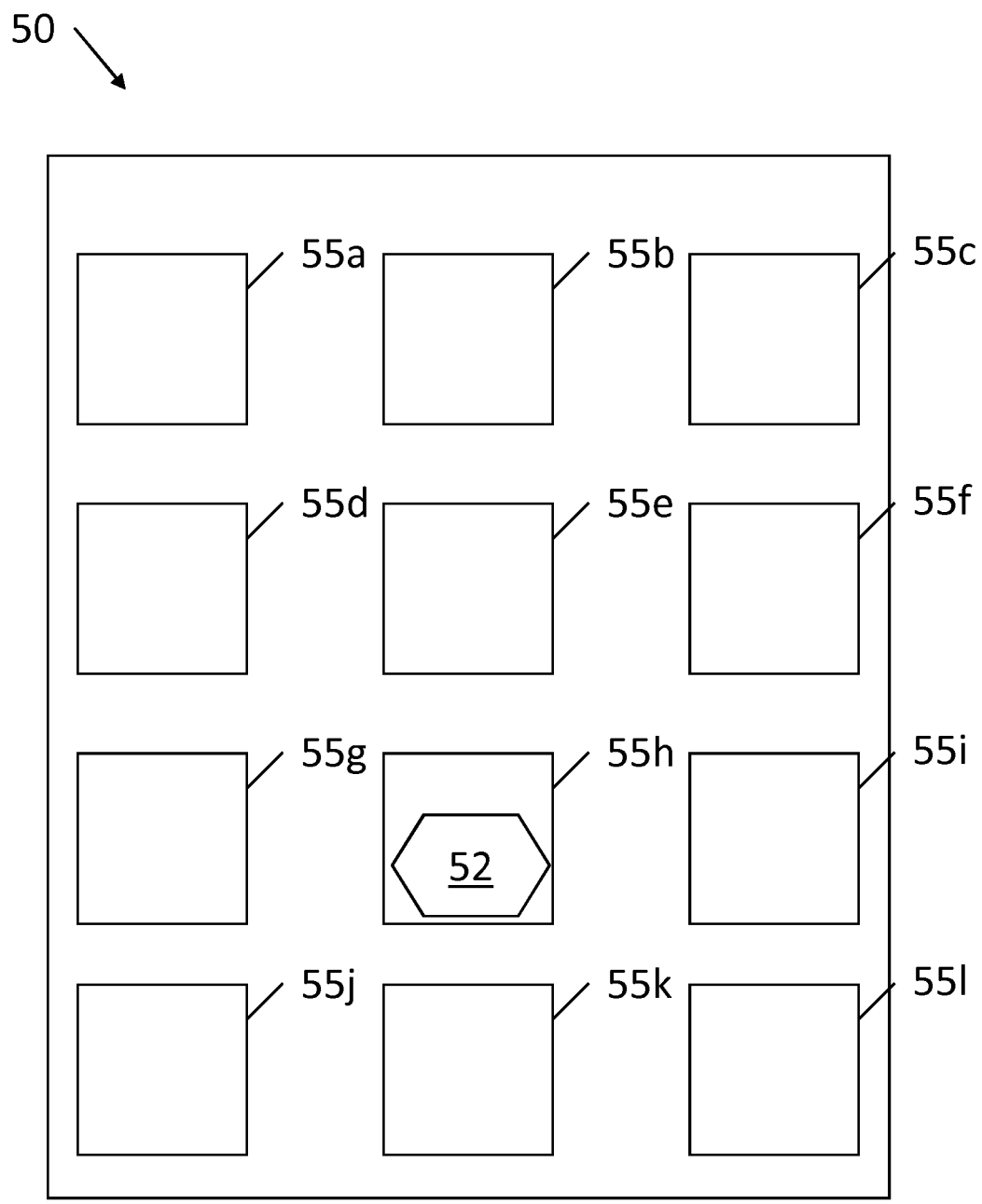
FIG. 4 shows the transmitting device of the user location system of FIG. 1, and a plurality of seating locations within the area of FIG. 3.

The area 50 is shown again in FIG. 4, but in this case showing a plurality of seating locations 55a to 55l within the area 50. As can be seen, the transmitting device 52 is location within the seating location 55h, indicating that the user has seated themselves at a seat in the seating location 55h.

Figure 5:
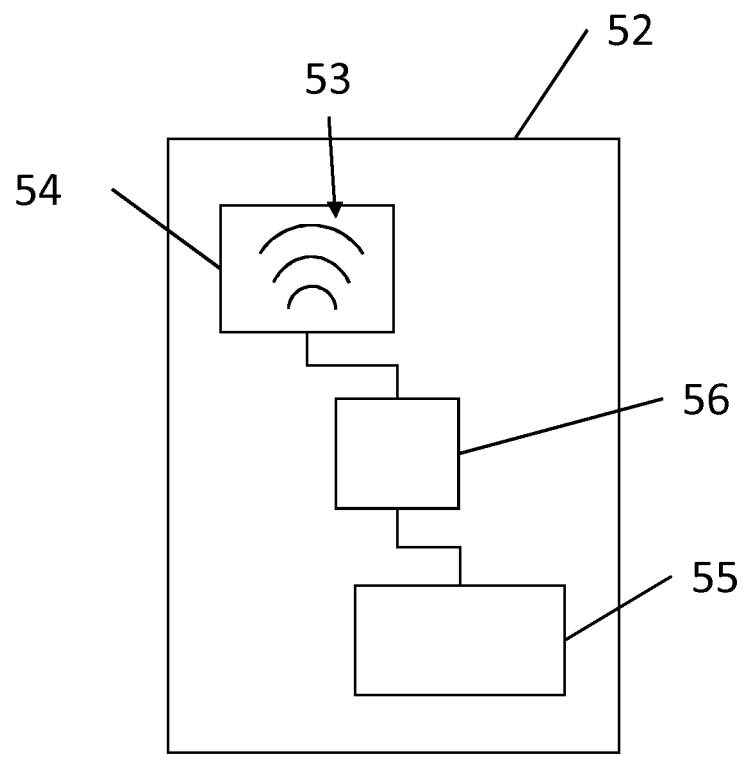
FIG. 5 shows the transmitting device of the user location system of FIG. 1.

The transmitting device 52 is shown in FIG. 5. The transmitting device 52 comprises a radio transmitter 54 which generates the radio signal 53, under the control of a control circuit 56. The transmitting device 52 also comprises a magnetic field detector 55. In practice the transmitting device 52 may, for example, be formed of moulded plastic in which the radio transmitter 54, control circuit 56 and magnetic field detector 55 are embedded, which may for example have dimensions such as 8 cm by 5 cm by 0.5 cm or the like. However, it will be appreciated that various other forms and types of transmitting device could be used in other embodiments of the invention. The transmitting device 52 and control circuit 56 may operate using the Bluetooth protocol, for example.

The operation of the user location system 100 is now described with reference to the flowcharts of FIGS. 6 and 7.

Figure 6:
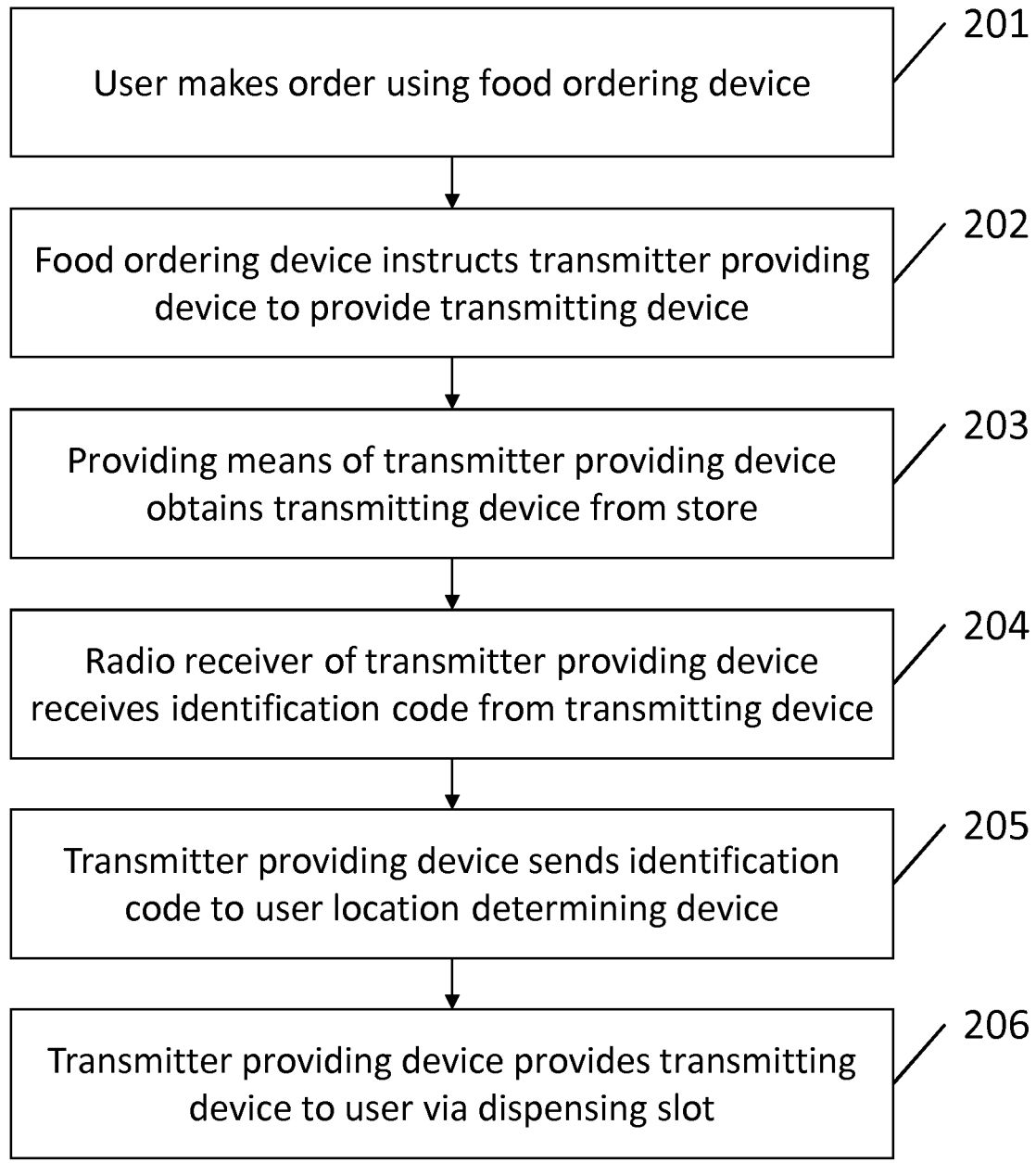
FIG. 6 is a flowchart showing the operation of the transmitter providing device of the user location system of FIG. 1 when a user makes a food order.

FIG. 6 shows the operation of the transmitter providing device 11 when a user makes a food order. First, the user makes the food order using the food ordering device 2 (step 201). The food ordering device 2 will assign an order number to the food order. The food order, including the order number, is sent to the order system of the kitchen of the quick service restaurant for preparation of the food order in the conventional way.

In response to the food order being successfully made, the food ordering device 2 also sends an instruction to the transmitter providing device 11 to provide a transmitting device to the user (step 202). The transmitter providing device 11 then uses its providing means to obtain a transmitter from the store 12, which in the present example is the transmitting device 52 (step 203).

The transmitting device 52 is arranged so that unless the magnetic field detected by the magnetic field detector 55 is below a threshold, in particular a threshold that is below the level of magnetic field 14a encompassing the store 12 (as generated by the magnetic field generator 14), no signals are transmitted by the radio transmitter 54. However, once the transmitting device 52 has been obtained from the store 12 by the providing means, it will no longer be within the magnetic field 14a (or more precisely, the magnetic field detected by the magnetic field detector 55 will be below the threshold). As a result, the control circuit 56 begins to cause the radio transmitter 54 to transmit a radio signal 53. This radio signal includes, in particular, an identification code assigned to the transmitting device 52.

The identification code may have been assigned to the transmitting device 52 when it was first manufactured, i.e. it could be a unique identification code associated with (only) the transmitting device 52. However, it will be appreciated that the identification code could be provided in other ways in different embodiments of the invention, and could for example be a temporary code generated on the fly, and could be generated or obtained by the transmitter providing device 11 and then communicated to the transmitting device 52 as the transmitting device 52 is provided to the user, for example.

As the transmitting device 52 begins to transmit the identification code, it is received by the radio receiver 15 of the transmitter providing device 11 (step 204). The transmitter providing device 11 then sends the identification code to the user location determining device 101 (step 205). It also sends the identification code to the food ordering device 2, which passes it to the order system of the kitchen so that the order system knows that the identification code is associated with the order number.

The transmitter providing device 11 then provides the transmitting device 52 to the user, via the dispending slot 13 (step 206). Once the user has the transmitting device 52, they move to one of the seating locations 55a to 55l within the area 50, and in particular, in the present example, to the seating location 55h as shown in FIG. 4.

In order to be able to continue providing transmitting devices to users, the store 12 of the transmitter providing device 11 will need to be replenished with transmitting devices. In a particularly advantageous embodiment, the transmitter providing device 11 is able to receive transmitting devices inserted into the dispensing slot 13, which are then added to the store 12. In embodiments of the invention, as a transmitting device is received in the dispensing slot 13 an identification code is generated or obtained by the transmitter providing device 11 and then communicated to the transmitting device 52, for it to use as its identification code when it is later used to locate a user.

Figure 7:
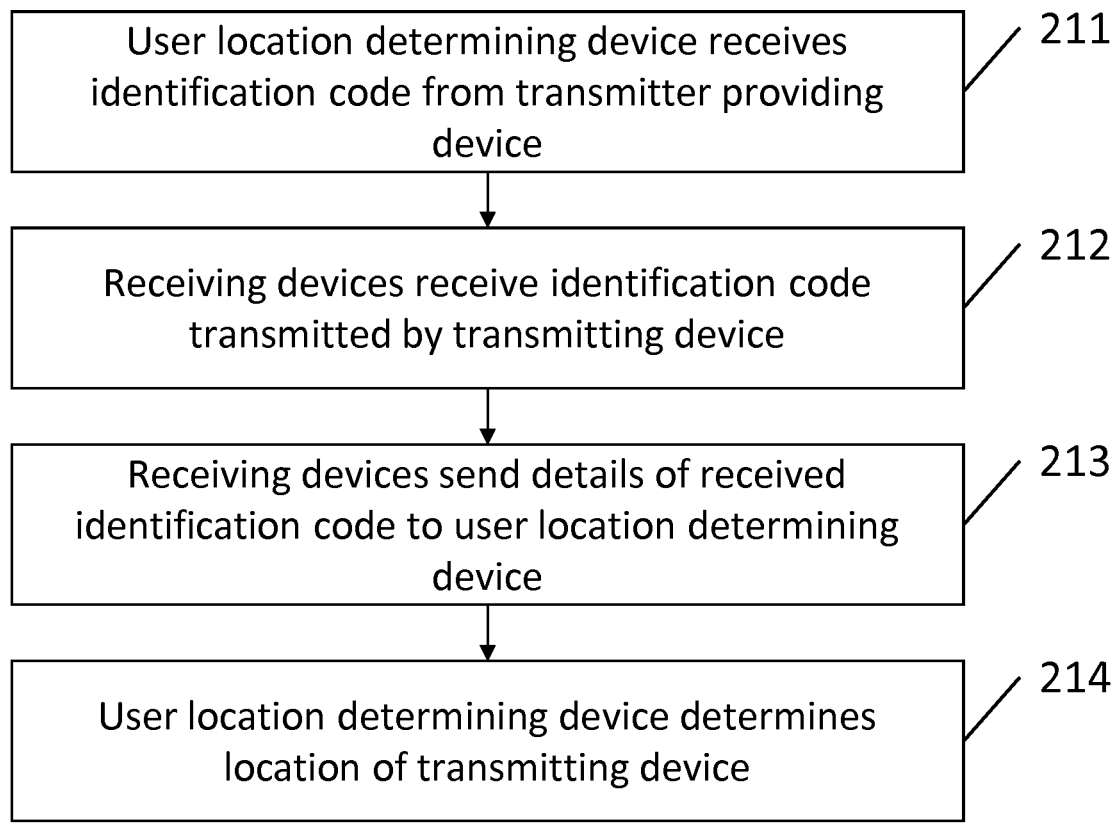
FIG. 7 is a flowchart showing the operation of the user location determining device of the user location system of FIG. 1 when locating a user within the area of FIGS. 3 and 4.

FIG. 7 shows the operation of the user location determining device 101 when locating a user within the area 50, and in particular in the present example the user provided with the transmitting device 52. First, as described above the user location determining device 101 receives the identification code for the user from the transmitter providing device (step 211). The user location determining device 101 also receives the order number from the food ordering device 2.

In addition, one or more of the receiving devices 51a to 51g receive the identification code transmitted by the transmitting device 52 (step 212). In the present example, the one or more receiving devices that receive the identification code are the receiving devices 51d, 51e, 51f and 51g closest to the transmitting device 52, once the user has moved to the seating location 55h.

The receiving devices 51d, 51e, 51f and 51g then send details of the received identification code to the user location determining device 101 (step 213). As well as including the identification code itself, the details sent include other details such as the time the identification code was received, the strength of the received signal, and the direction from which the identification code is received if a receiving device is able to determine that (if it comprises multiple aerials, for example).

The user location determining device 101 then uses the received details to determine the location of the transmitting device 52 (step 214). It does this by considering only received details with the identification code of the transmitting device 52 (and not received details with any other identification code, which may have been received from other transmitting devices). The user location determining device 101 can then, for example, use the locations of the receiving devices 51d, 51e, 51f and 51g in the area 50, and the strengths of the signal received by each of the receiving devices, to determine where the received signals must have originated from, i.e. the location of the transmitting device 52. The locations of the receiving devices 51a to 51g, including the receiving devices 51d, 51e, 51f and 51g, can be provided to the user location determining device 101 when the receiving devices 51a to 51g are installed as part of the initial setup of the user location system 100, for example.

Where there is a set of possible locations, e.g. the set of seating locations 55a to 55l, the user location determining device 101 can determine the location of the user to be one of the set of possible locations, which can make the determination both more efficient and more accurate.—However, it will be appreciated that there will be various different ways in which the location determination can be performed in different embodiments of the invention.

Once the user location determining device 101 has determined the location of the transmitting device 52, it can provide this information to the order system of the kitchen so that the food order can be taken to the user. This may be done by the order system displaying the order number and location on a display in the kitchen, or in any other suitable way.

In certain advantageous embodiments, when the food order is ready this is communicated to the user location determining device 101. The user location determining device 101 then communicates this to the transmitting device 52 using the receiving devices 51a to 51g, for example via a Bluetooth connection between the transmitting device 52 and one or more of the receiving devices 51a to 51g. The transmitting device 52 can then provide a notification to the user that their order is ready, for example using a light and/or vibration signalling means comprised in the transmitting device 52.

Figure 8:
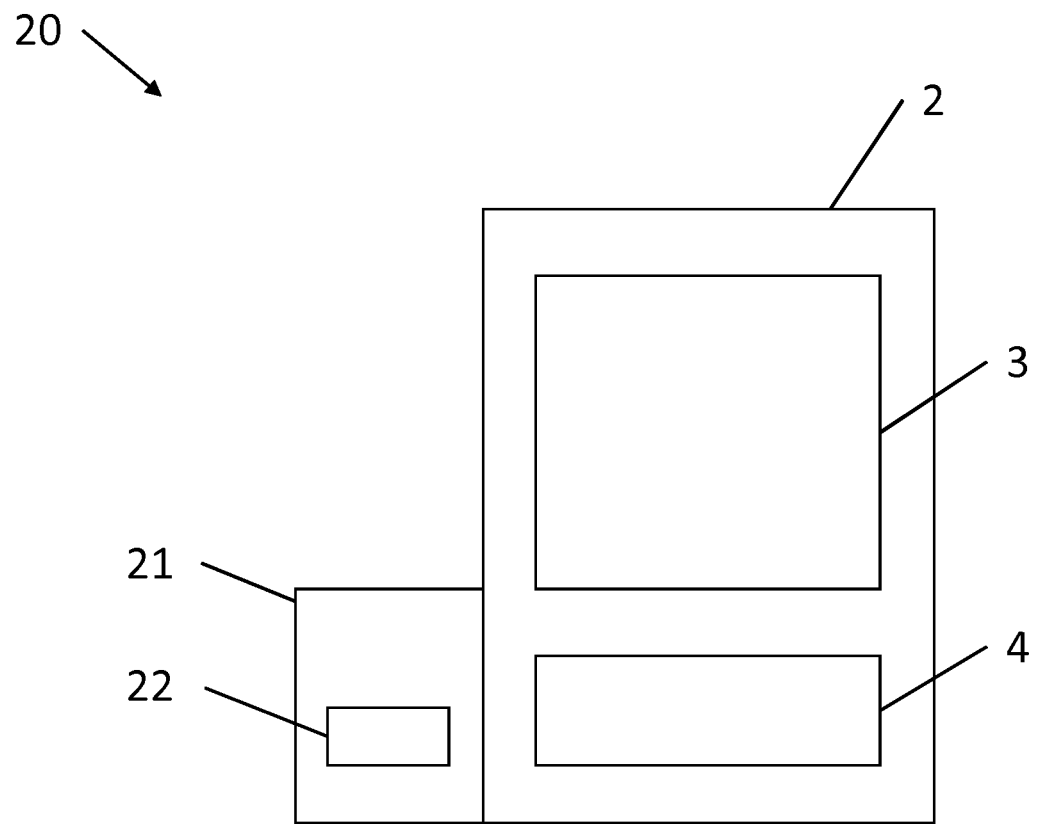
FIG. 8 shows a transmitter providing device in accordance with an alternative embodiment of the invention.

A transmitter providing device in accordance with another embodiment of the invention is shown in FIG. 8. As with the transmitter providing device 11 of the previous embodiment, the transmitter providing device 21 of the present embodiment is provided next to, and is in communication with, the food ordering device 2.

Unlike the transmitter providing device 11 of the previous embodiment, the transmitter providing device 21 of the present embodiment does not comprise a store of transmitting devices for providing to users. Rather, the transmitter providing device 21 comprises a Bluetooth device 22, for communication with a mobile device such as a mobile telephone with Bluetooth capability.

In use, rather than providing a transmitting device to a user from a store of transmitting devices, the user is asked to place a mobile device against the Bluetooth device 22 of the transmitter providing device 21. This may be via a message displayed by the food ordering device 2, for example. The transmitter providing device 21 then provides the identification code to the mobile device using the Bluetooth device.

The identification code may be generated by the transmitter providing device 21 itself, or it may be obtained from elsewhere by the transmitter providing device 21, and may simply be the order number. In alternative embodiments, the mobile device provides the identification code to the transmitter providing device 21. In this case the identification may be a unique code associated with the mobile device, with an application ("app") installed on the mobile device for use with the user location system, or with the user themselves.

The mobile device is then arranged to transmit the identification code provided by or to the transmitter providing device 21. In this way, the mobile device becomes the transmitting device provided to the user, and can then be located using by the user location determining device as described above.

As described above, the mobile device may be arranged to provide a notification to the user when their order is ready. Where an app is installed on the mobile device for use with the user location system, the standard notification means of the mobile device may be used.

While the present invention has been described and illustrated with reference to particular embodiments, it will be appreciated by those of ordinary skill in the art that the invention lends itself to many different variations not specifically illustrated herein.

For example, it will be appreciated that while various communication protocols and systems such as LAN, Wi-Fi and Bluetooth have been described, the present invention is not limited to the use of such communication protocols and systems, and any other appropriate communication protocols and systems could be used, for example near-field communication (NFC).

It will in particular be appreciated that the present invention is applicable to scenarios other than a quick service restaurant, including but other types of restaurant, retail stores providing a click-and-collect service, or any other appropriate scenario.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of determining the location of a user in an area, using:
 a transmitter providing device located at a first location, the transmitter providing device further comprising a store of a plurality of transmitting devices, wherein the transmitter providing device generates a magnetic field that is above a predetermined threshold at locations within the store of transmitting devices, and the transmitting devices are arranged to transmit an identification code only when not within a magnetic field that is above the predetermined threshold;
 a plurality of receiving devices distributed in different locations within the area; and
 a user location determining device in communication with the plurality of receiving devices;
 wherein the method comprises the steps of:
 a user at the first location requesting a transmitting device from the transmitter providing device;
 the transmitter providing device associating an identification code with the user;
 the transmitter providing device providing the user with a transmitting device and communicating the identification code associated with the user to the transmitting device, wherein the transmitting device transmits the identification code associated with the user;
 the user moving to a second location with the transmitting device, the second location being within the area;
 one of more of the receiving devices receiving the identification code transmitted by the transmitting device;
 the one or more receiving devices sending details of the received identification code to the user location determining device; and
 the user location determining device determining the location of the user, using the received details from the one or more receiving devices.

2. A user location system for determining the location of a user in an area, comprising:
 a transmitter providing device located at a first location, the transmitter providing device further comprising a store of a plurality of transmitting devices, wherein the transmitter providing device generates a magnetic field that is above a predetermined threshold at locations within the store of transmitting devices, and the transmitting devices are arranged to transmit an identification code only when not within a magnetic field that is above the predetermined threshold;
 a plurality of receiving devices distributed in different locations within the area; and
 a user location determining device in communication with the plurality of receiving devices;
 wherein the transmitter providing device is arranged, in response to a request from a user for a transmitting device, to associate an identification code with the user, and to provide the user with a transmitting device and to communicate the identification code associated with the user to the transmitting device;
 wherein the transmitting device is arranged to transmit the identification code associated with the user;
 wherein the plurality of receiving devices are arranged to receive the identification code transmitted by the transmitting device, and to send details of a received identification code to the user location determining device;
 and wherein the user location determining device is arranged to determine the location of a user using received details from the one or more receiving devices.

* * * * *